United States Patent
Podlipnig et al.

(10) Patent No.: US 11,373,167 B2
(45) Date of Patent: Jun. 28, 2022

(54) METHOD FOR ESTABLISHING COMMUNICATION BETWEEN A TRANSACTION TERMINAL AND A MOBILE DEVICE WHILE AVOIDING AN AUTOMATIC START OF AN APPLICATION IN THE MOBILE DEVICE

(71) Applicant: Research Industrial Systems Engineering (RISE), Schwechat (AT)

(72) Inventors: Stephan Lukas Podlipnig, Vienna (AT); Johannes Seiter, Vienna (AT); Stefan Bachl, Vienna (AT); Florian Strohmayer, Vienna (AT)

(73) Assignee: RESEARCH INDUSTRIAL SYSTEMS ENGINEERING (RISE), Schwechat (AT)

( * ) Notice: Subject to any disclaimer, the term of this patent is extended or adjusted under 35 U.S.C. 154(b) by 0 days.

(21) Appl. No.: 17/222,155

(22) Filed: Apr. 5, 2021

(65) Prior Publication Data

US 2021/0383354 A1     Dec. 9, 2021

(30) Foreign Application Priority Data

Jun. 3, 2020  (AT) .............................. A 50478/2020

(51) Int. Cl.
  *G06Q 20/32*   (2012.01)
  *H04W 76/10*   (2018.01)

(52) U.S. Cl.
  CPC ........ *G06Q 20/3278* (2013.01); *H04W 76/10* (2018.02)

(58) Field of Classification Search
  CPC .............. G06Q 20/3278; H04W 76/10; G06K 7/01297; G06K 7/10128; H04B 5/0031; H04B 5/02; H04B 5/0056
  (Continued)

(56) References Cited

U.S. PATENT DOCUMENTS

2014/0263643 A1* 9/2014 Kim .................... G06K 7/10039
                                                                235/439
2017/0098149 A1* 4/2017 Kesler ................ G06K 19/0726
(Continued)

*Primary Examiner* — Eugene Yun
(74) *Attorney, Agent, or Firm* — Workman Nydegger

(57) ABSTRACT

In a method for establishing communication between a transaction terminal (1) and a mobile device (2; 6) located within communication range (5), wherein the transaction terminal (1) is able to communicate in an active and in a passive communication mode and wherein the following process steps are performed:
  activating the passive communication mode in the transaction terminal (1) for a first time range (t3-t4; t7-t8) in order to establish a passive communication of the transaction terminal (1) with a mobile active device (6) possibly located within communication range (5);
  activating the active communication mode in the transaction terminal (1) for a second time range (t5-t6) in order to establish an active communication of the transaction terminal (1) with a passive mobile device (2) possibly located within communication range (5), if communication with a mobile active device (6) was not established in the first time range (t3-t4; t7-t8);
  detecting a carrier signal (7) of a mobile active device (6) possibly located outside the communication range (5) during the first time range (t3-t4; t7-t8) as well as during a third time range (t10-t12);
  remaining in the passive communication mode of the transaction terminal (1) for the third time range (t10-t12), if the carrier signal (7) of the mobile active device (6) has been detected in order to establish a passive communication of the transaction terminal (1) with the mobile active device (6), if the mobile active device (6) gets within communication range (5) during the third time range (t10-t12).

5 Claims, 3 Drawing Sheets

(58) Field of Classification Search
USPC .......................................................... 455/41.2
See application file for complete search history.

(56) References Cited

U.S. PATENT DOCUMENTS

2018/0227019 A1* 8/2018 Kovacic ............. G06K 19/0723
2019/0331777 A1* 10/2019 Udengaard .......... G01V 1/3861

* cited by examiner

METHOD FOR ESTABLISHING COMMUNICATION BETWEEN A TRANSACTION TERMINAL AND A MOBILE DEVICE WHILE AVOIDING AN AUTOMATIC START OF AN APPLICATION IN THE MOBILE DEVICE

BACKGROUND OF THE INVENTION

The invention relates to a method for establishing communication between a transaction terminal and a mobile device located within communication range according to the preamble of claim 1, wherein the transaction terminal is able to communicate in an active and in a passive communication mode.

A person skilled in the art is familiar with the technologies for establishing an NFC communication as specified in the ISO 14.443 and ISO 18.092 standards. In this regard, NFC represents the well-known technology "Near Field Communication". For processing a transaction (e.g., a payment, the opening of a door, etc.) by means of contactless NFC technology, two different system parts are required:

An active reading system part which both actively sends out NFC activation signals ("search for a card") and— as soon as a corresponding passive counterpart (e.g., a card) is located in the field—reads out the counterpart's information and processes the transaction. Hereinafter, also referred to as an active communication mode.

A passive system part which has information that is to be read out (e.g., a card with a corresponding key which is required for processing a transaction). Hereinafter, also referred to as a passive communication mode.

With regard to the active role of cards and terminal devices, the following starting situations can currently be found:

Simple plastic cards, e.g., stickers or wristbands with NFC chips, can serve only as a passive system part, for example, due to the lack of a separate energy supply. For reading them out, an active reader is definitely required as a counterpart that generates the NFC field.

For terminal devices which have the Android operating system (e.g., smartphones, tablets and the like) and which technologically support NFC, it is possible to develop applications that selectively assume the active role (as a reader) or the passive role (simulating an NFC card, "HCE mode") during transaction processing. Thus, there is great flexibility in the design and development of an overall system.

Terminal devices of the Apple brand which are equipped with the iOS operating system (iPhones etc.) can only be used as readers in application development. The simulation of a card is not supported for application development. The activation signals are sent out at a fixed interval of 300 to 350 milliseconds, depending on the iOS terminal device. In this case, the duration and strength of activation signals differ between individual iPhone generations (e.g., iPhone 8 and iPhone X). Furthermore, from the generation of the iPhone X onwards, activation signals have been sent out permanently in the background (scanning for passive system parts) as soon as the display is active.

From this compilation, it becomes apparent that, so far, it has not been possible to equip one and the same transaction terminal with a uniform implementation for transaction processing for both plastic cards and iOS terminal devices: plastic cards cannot discern the active, iOS terminal devices cannot discern the passive system part (in application development). Android devices can be used both actively and passively.

Furthermore, the behavior shown by iOS terminal devices is that, when NFC activation signals are received from any other NFC device, the Apple Pay application is inevitably and automatically started as a passive system part on the iOS terminal device; even if, from the user's point of view, no Apple Pay transaction is to be carried out with the iOS terminal device. Moreover, the Apple Pay application is started from the background, even if the display is switched off. Even starting with an application that does not require a technical or functional application scenario with NFC interaction, it is only possible with the so-called "Apple Pay Suppression Entitlement" to prevent the Apple Pay application from being started and from subsequently overlaying the currently used application in an undesirable manner. The "Apple Pay Suppression Entitlement" is granted according to allocation criteria not apparent to the public after the application developer has sent a request to Apple and an assessment has been performed by Apple. The "Apple Pay Suppression Entitlement" that is used ensures that the Apple Pay application is not started or, respectively, one's own application is not overlaid therewith only during the runtime of one's own application. Furthermore, it is not possible for the application developer to programmatically deactivate the start of the Apple Pay application in other ways and also before or, respectively, after the runtime of their own application. Furthermore, the transmission of NFC activation signals by the iOS terminal device cannot be influenced in an application-specific manner (e.g., deactivated), either.

The problem of the inevitable and automatic activation of an application during communication setup, as described above on the basis of iOS terminal devices, serves only as a concrete example illustrating the issue for a person skilled in the art. However, this inevitable and automatic activation on the mobile device can, for example, also concern a communication application for retrieving new messages or a weather application for retrieving current weather data.

BRIEF SUMMARY OF THE INVENTION

The present invention is based on the object of creating a method in which communication setup is enabled between a transaction terminal and a mobile device located within communication range without an application in the mobile device being inevitably and automatically activated. In particular, contactless communication between the transaction terminal and all NFC active and passive system parts as known to a person skilled in the art, i.e., devices/cards and iOS terminal devices, is to be enabled without an application being inevitably and automatically started in one of these active or passive system parts.

According to the invention, this object is achieved by a method having the features of claim 1. The transaction terminal thereby detects in first time ranges when its passive communication mode is activated by means of a sensitive detector as to whether a carrier signal of the NFC activation signal of a mobile device still located outside the communication range, which carrier signal is emitted at a frequency of 13 to 14 MHz and, in particular, of 13.56 MHz, can be detected. The NFC communication range or, respectively, the so-called near field in which NFC devices are able to communicate and exchange data is about 10 cm. The carrier signal of the NFC activation signal of a mobile active NFC device can be detected by the sensitive detector of the transaction terminal already at a distance of 0.5 to 1 m between the transaction terminal and the mobile active NFC device. At this distance, the load modulation by the passive NFC device is too weak and cannot yet be demodulated by the active NFC device, for which reason NFC activation and coupling cannot be performed outside the communication range. However, through the detector according to the invention, the transaction terminal knows at an early stage that a mobile active NFC device is approaching the transaction terminal and will possibly get within the communication range very soon. If the NFC device is an iOS terminal device, then, in the course of receiving the wake-up package (WUPA/WUPB, according to ISO standard 14.443), the Apple Pay application would also be started directly, which is prevented by the transaction terminal remaining in the passive communication mode for the duration of the third time range of a few seconds even before the iOS terminal device gets into the near field. Since, as a result, the iOS terminal device itself does not detect any active reading system part in the near field, the Apple Pay application is not started, either.

The switching according to the invention of the transaction terminal into the passive communication mode upon early detection of an active NFC system part still outside the communication range reliably prevents that, when the NFC activation signals are received by iOS terminal devices (iPhones etc.), opening of the Apple Pay application is triggered and a planned transaction is thus cancelled. Furthermore, the early detection allows the transaction terminal to make itself available to any approaching active system part immediately and independently as a passive system part in order to thereby enable data exchange in particular for iOS terminal devices.

If the mobile active NFC device detected early by the transaction terminal does not get into the near field of the transaction terminal during the third time range, the passive and the active communication modes of the transaction terminal are activated again periodically in consecutive first and second time ranges in order to be available for communication with the passive and active system parts of the NFC technology.

If the transaction terminal is in the process of trying to establish active communication in the second time range and an iOS terminal device is brought into the near field particularly quickly, it may happen that the iOS terminal device is not detected by the detector and therefore can no longer be switched into the passive communication mode of the transaction terminal in due time. In order to avoid this case in which the Apple Pay application would be started again undesirably in the iOS terminal device, the transaction terminal also directly emits, in second time ranges, an application deactivation command to mobile devices possibly located in the near field in the course of a proprietary anti-collision procedure in order to prevent the automatic start of the Apple Pay application. In this way, it is ensured also for this special case of an iOS terminal device being moved particularly quickly into the near field that other applications apart from Apple Pay can be processed within the framework of NFC communication.

Also in an application scenario in which an iPhone is located in close range of a transaction terminal trying to establish active communication and, concurrently, a user starts a QR code application on the iPhone in order to scan a QR code on the display of the transaction terminal, the transaction terminal enables by emitting the application deactivation command in the course of a proprietary anti-collision procedure that the Apple Pay application will not start automatically, forcing the QR application on the iPhone into the background, whereupon the user would no longer be able to scan the QR code.

Advantageous embodiments of the method according to the invention, as well as alternative embodiment variants, are explained in further detail below with reference to the figures.

DETAILED DESCRIPTION OF THE PREFERRED EMBODIMENTS

Figure 1:
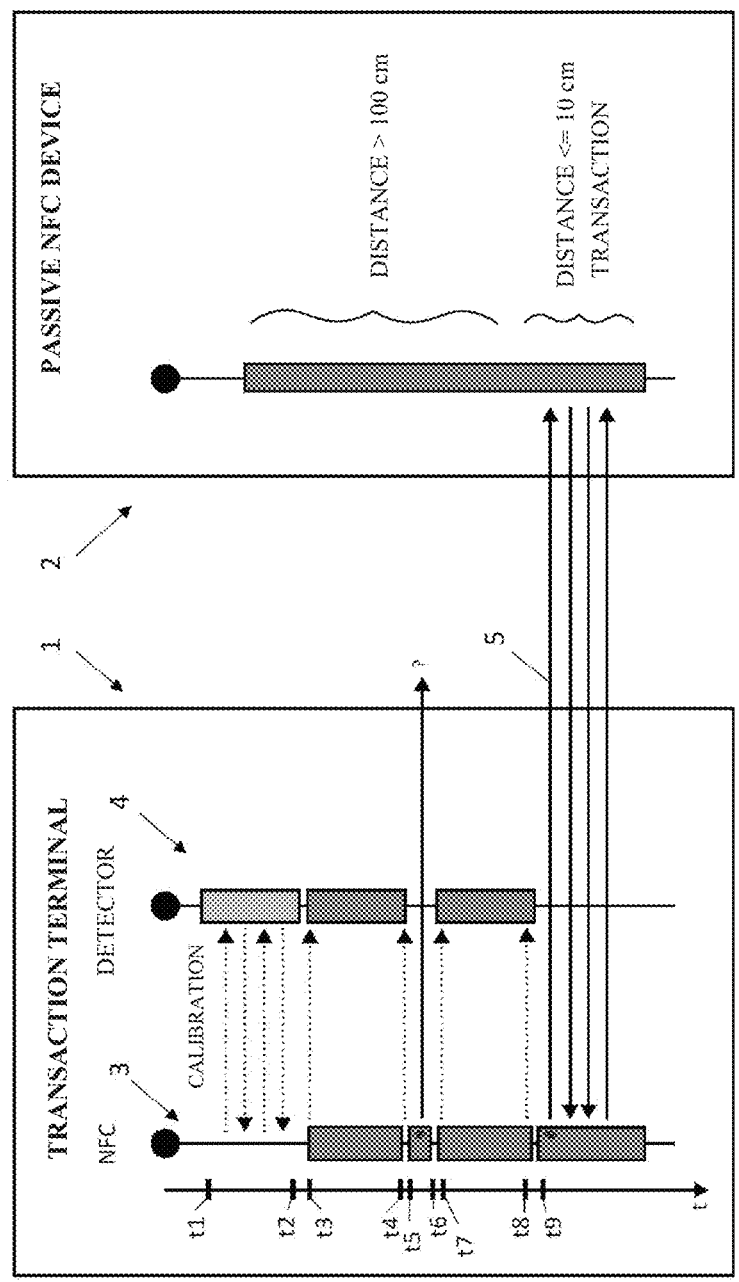
FIG. 1 shows the communication setup between a transaction terminal and a passive mobile NFC device.

FIG. 1 shows the communication setup between a transaction terminal 1 and a mobile passive NFC device 2, wherein the transaction terminal 1 is able to communicate in an active and in a passive communication mode. According to this exemplary embodiment, the transaction terminal 1 is a payment terminal in a shop and the mobile passive NFC device 2 is a customer card by means of which a loyalty bonus can be redeemed in order to reduce the purchase price and which can communicate only passively in the RFID field established by the transaction terminal 1. In this case, the communication setup meets the conditions specified in the ISO 14.443 and ISO 18.092 standards for establishing NFC communication in accordance with NFC technology.

The transaction terminal 1 has an NFC IC 3 with the circuitry known to a person skilled in the art. An example of such an NFC IC 3 comprising a circuit is "NXP PN5180". The transaction terminal 1 furthermore has a detector 4 designed for detecting the carrier frequency of 13.56 MHz of the RFID field as specified in the above standards. For this purpose, the detector 4 has several filter stages and an amplifier stage which filters this very carrier frequency out of the received signal of the antenna of the transaction terminal 1 and amplifies it in order to detect an active NFC device meeting the NFC standard already at a distance of 50 to 100 cm from the transaction terminal 1.

A time axis t is shown in FIG. 1, by means of which the method and the temporal sequence of the communication setup are clarified. The transaction terminal 1 activates a calibration mode periodically from a point in time t1 to a point in time t2, in which the transaction terminal 1 generates the RFID field with the carrier frequency of 13.56 MHz in order to check as to whether said field is detected by the detector 4 with the appropriate signal intensity. As a result of the calibration mode, a change in the amplification of the amplifier stage or a change in the filter characteristic of the filter stages may occur.

In a process step following the calibration mode, the passive communication mode is activated in the transaction terminal 1 for a first time range from point in time t3 to point in time t4 in order to establish a passive communication of the transaction terminal 1 with an active mobile NFC device possibly located within NFC communication range 5. The NFC communication range 5 or, respectively, the so-called near field, in which NFC devices are able to communicate and exchange data, is about 10 cm. According to the exemplary embodiment in FIG. 1, the distance between the transaction terminal 1 and the passive NFC device 2 is more than 100 cm in the first time range. Furthermore, the passive NFC device 2 could indeed communicate only via the RFID field generated by the transaction terminal 1, which, however, is not emitted by the transaction terminal 1 in the first time range, for which reason there is no NFC communication setup between the transaction terminal 1 and the passive NFC device 2 in the first time range.

In a subsequent process step, the active communication mode is activated in the transaction terminal 1 for a second time range from a point in time t5 to a point in time t6 in order to establish an active communication of the transaction terminal 1 with the mobile passive NFC device 2 possibly located in NFC communication range 5, since no communication with a mobile passive NFC device 2 was established in the first time range. According to the exemplary embodiment in FIG. 1, the distance between the transaction terminal 1 and the passive NFC device 2 is still more than 100 cm in the second time range, i.e., outside the NFC communication range 5. For this reason, the RFID field emitted by the transaction terminal 1 either is not received at all by the passive NFC device 2 or the possibly received RFID field is too weak for enabling communication through load modulation. For this reason, still no communication is established between the transaction terminal 1 and the passive NFC device 2 in the second time range, either.

Therefore, the transaction terminal 1 subsequently again switches to the passive communication mode for a further first time range from a point in time t7 to a point in time t8. Since the passive NFC device 2 is still outside the NFC communication range 5 also in this renewed first time range, the transaction terminal 1 again switches to the active communication mode at a point in time t9. At the point in time t9, the passive NFC device 3, i.e., the customer card, was held sufficiently close to the transaction terminal 1, i.e., the payment terminal, so that the two NFC devices are within NFC communication range 5 and the transaction of redeeming the loyalty bonus can be processed in accordance with the NFC standard.

Figure 2:
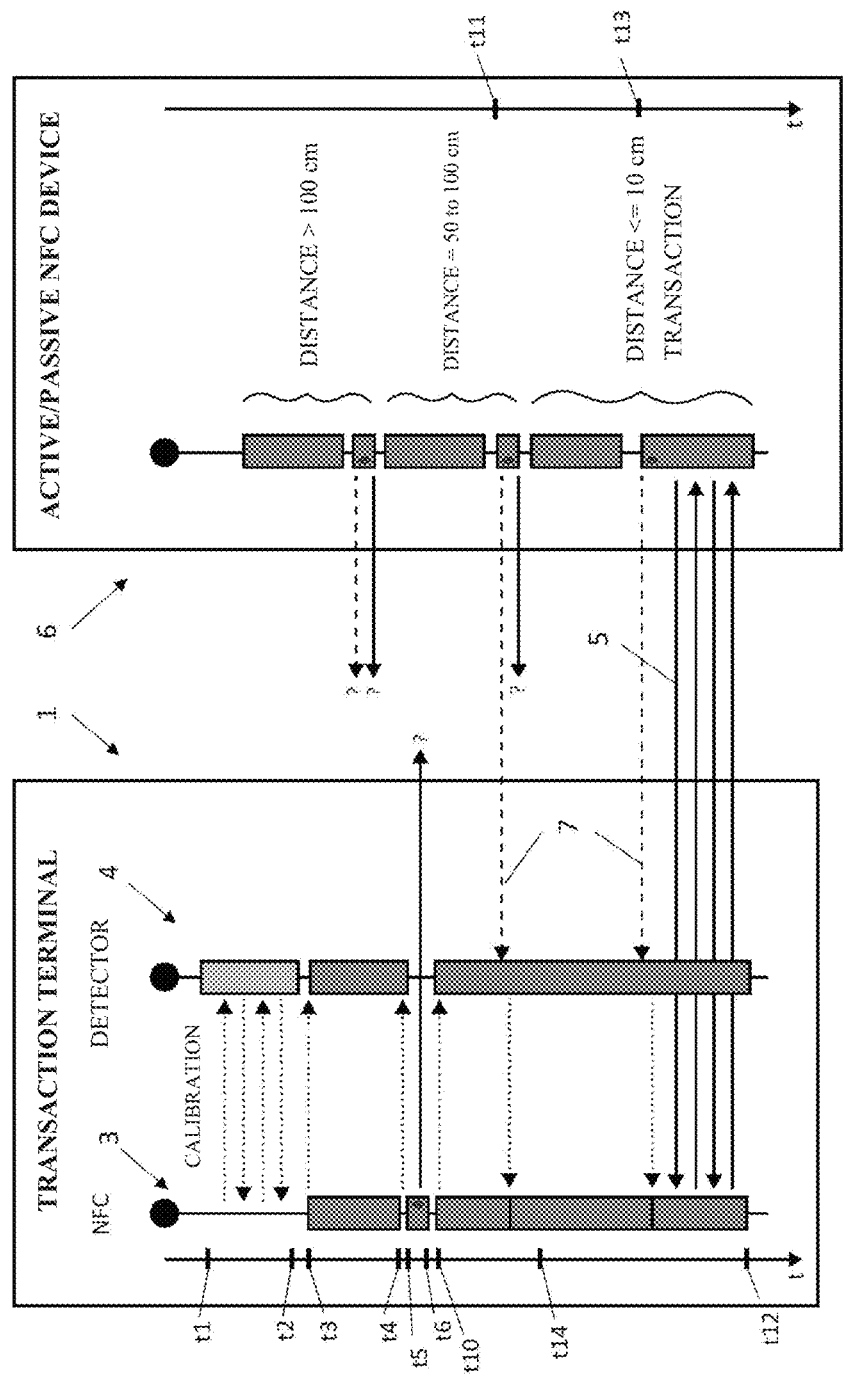
FIG. 2 shows the communication setup between the transaction terminal and a mobile NFC device alternating actively/passively.

FIG. 2 shows the communication setup between the transaction terminal 1 and a mobile active/passive NFC device 6, the active/passive NFC device 6 being formed by an iPhone from Apple and being able to communicate in an active and in a passive communication mode. The iPhone is based on the iOS operating system, which, upon detection of an NFC device in its active communication mode in the NFC communication range 5, automatically switches to the passive communication mode and starts a so-called Apple Pay application in which the iPhone behaves, for example, like a credit card for carrying out a transaction to pay for an article with the credit card. According to this exemplary embodiment, the transaction terminal 1 is a payment terminal in a shop and the user of the iPhone does not wish to pay with the Apple Pay application, but wishes to read out a loyalty bonus saved in the payment terminal with a bonus card application so as to save it in the bonus card application in the iPhone. In this case, the communication setup meets the conditions specified in the ISO 14.443 and ISO 18.092 standards for establishing communication in accordance with NFC technology.

As already described with regard to FIG. 1, the calibration is performed between the points in time t1 and t2. The passive communication mode activated in the transaction terminal 1 during the first time range from point in time t3 to point in time t4 and the active communication mode activated in the transaction terminal 1 during the second time range from point in time t5 to point in time t6 do not lead to a communication setup, since the distance between the communication terminal 1 and the active/passive NFC device 6 is more than 100 cm and thus too large.

The active/passive NFC device 6, which, like the transaction terminal 1, is able to communicate both actively and passively, also activates the passive communication mode in first time ranges and the active communication mode in second time ranges in order to enable communication to be established. At a point in time t10 at which the distance between the transaction terminal 1 and the active NFC device 6 is 50 cm to 100 cm, that is, for example, 60 cm, the transaction terminal 1 activates the passive communication mode again in the first time range. The active/passive NFC device 6 activates the active communication mode at point in time t11 again in the second time range and emits the carrier signal 7 with a carrier frequency of 13.56 MHz of the RFID field, which carrier signal is detected by the detector 4 of the transaction terminal 1, which is just in its passive communication mode in the first time range. Since the distance between the transaction terminal 1 and the active NFC device 6 is just 60 cm and thus larger than the NFC communication range 5 of, at most, 10 cm, communication is not yet established.

The transaction terminal 1 is now designed to remain in the passive communication mode of the transaction terminal 1 for a third time range when the carrier signal 7 of the active/passive NFC device 6 has been detected in order to establish a passive communication of the transaction terminal 1 with the active/passive NFC device 6 in its active communication mode when the active/passive NFC device 6 gets within the NFC communication range 5 during the third time range. According to the exemplary embodiment in FIG. 2, the third time range, which is extended significantly in comparison to the second time range, lasts until point in time t12, whereby it is rendered possible that the active/passive NFC device 6 activates the active communication mode at a point in time t13 in a further second time range. At this point in time t13, the distance between the transaction terminal 1 and the active NFC device 6 is smaller than or equal to 10 cm, that is, for example, 6 cm. At this point in time t13, the transaction terminal 1 and the active/passive NFC device 6 are thus within the NFC communication range 5, for which reason an NFC communication is established in which the transaction terminal 1 in the passive communication mode uses the RFID field of the active NFC device 6, which is in the active communication mode.

As a result, the advantage is obtained that the transaction terminal 1 has been prevented from reactivating its active communication mode after the first time period has elapsed after point in time t10, i.e., at point in time t14. If the active/passive NFC device 6, which was in its passive communication mode at this point in time t14, had already been in the NFC communication range 5 relative to the transaction terminal 1, then an NFC communication would have been established in which the transaction terminal 1 in its active communication mode and the active/passive NFC device 6 in its passive communication mode would have communicated. In this case, the active/passive NFC device 6, i.e., the iPhone based on the iOS operating system, would have started the Apple Pay application forcibly and automatically. However, this would have prevented the user of the iPhone from being able to start the bonus card application in order to read out and save the loyalty bonus formed by a numerical security code and saved in the transaction terminal 1. The method according to the invention for establishing communication thus enables the forcibly and automatically performed start of the Apple Pay application in application scenarios in which the transaction terminal 1 and the active/passive NFC device 6 are to process transactions other than those that can be performed with the Apple Pay application.

The method according to the invention has been explained using the example of the Apple Pay application and the setup of an NFC communication, but is in no way restricted thereto. Moreover, there might be further application scenarios in which a transaction terminal and a mobile device, with one of them communicating in the active and the other one in the passive communication mode, establish communication and an application is forcibly and automatically started in the mobile device, whereby other possible transactions or communications between the transaction terminal and the mobile device are prevented.

In the further course of the method according to the invention, the active communication mode is activated again in the transaction terminal 1 for the second time range in order to establish active communication of the transaction terminal 1 with a passive mobile NFC device 2, which possibly is in the NFC communication range 5, if no communication with the mobile active/passive NFC device 6 in its active communication mode was established in the third time range. The detection according to the invention of the carrier signal 7 and the subsequent extension of the passive communication mode in the transaction terminal 1 from the duration of the second time range to the duration of the third time range is indeed supposed to be an advance warning for the transaction terminal 1 with regard to an approaching active/passive NFC device 6. However, if the user of the active/passive NFC device 6 does not get any closer to the transaction terminal 1, i.e., does not bring the iPhone within the NFC communication range 5 of the payment terminal, the general switching between a passive communication mode during first time ranges and an active communication mode during second time ranges will again be performed.

It may be mentioned that the first time range can last, for example, 360 ms, the second time range can last, for example, 5 ms, and the third time range can last, for example, 2 seconds. However, depending on the application scenario, those time ranges may also be selected differently.

Since the transaction terminal 1 and possibly approaching active/passive NFC devices 6 generally have unsynchronized first and second time ranges, it may happen in a special case that the time ranges happen to proceed in an essentially synchronized manner and that, in second time ranges, both the transaction terminal 1 and the active/passive NFC device 6 are always just simultaneously in the active communication mode. In this case, the detector 4 cannot detect the carrier signal 7 of the approaching active/passive NFC device 6, since the detector 4 can detect the carrier signal 7 of the active/passive NFC device 6 always only in the passive communication mode of the transaction terminal 1. In this special case, it would not be possible to prevent the forced and automatic start of the Apple Pay application by extending the passive communication mode to the duration of the third time range. Similarly, it would be possible for the active/passive NFC device 6 to be brought close to the transaction terminal 1 so quickly that it will be within the NFC communication range 5 prior to the detection of the carrier signal 7.

Figure 3:
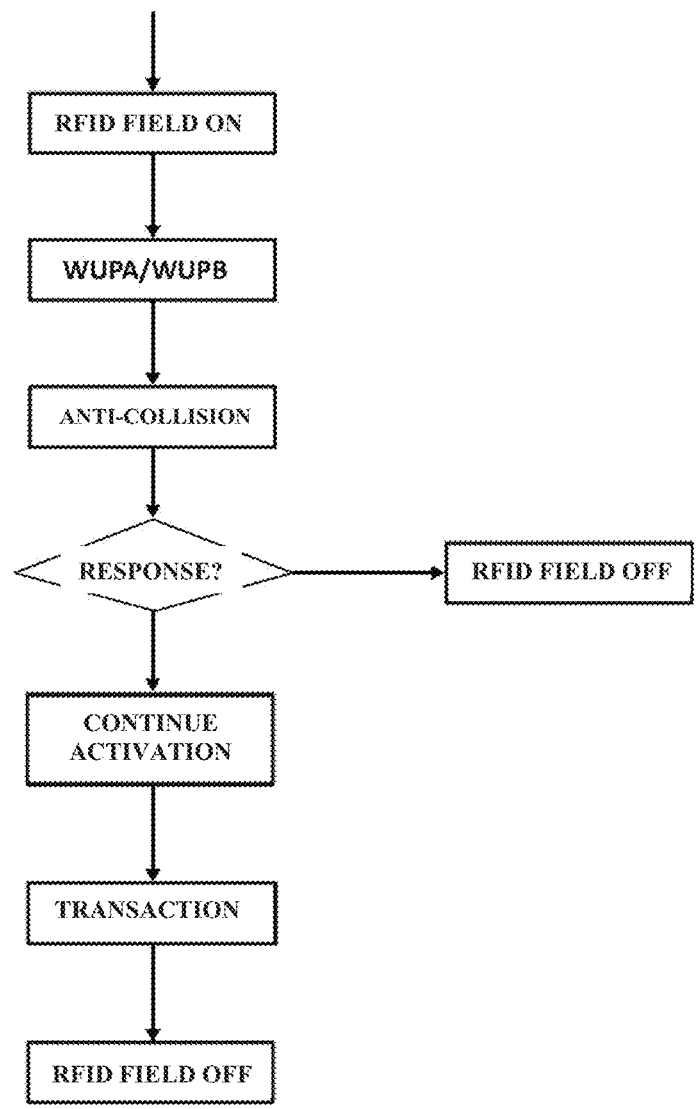
FIG. 3 shows the method for the communication setup according to FIG. 2.

For those two special cases, the method according to the invention comprises a further process step which prevents the forced and automatic start of the Apple Pay application. The transaction terminal 1 is designed for emitting an application deactivation command in the second time range directly during the setup of the active communication between the transaction terminal 1 and the active/passive NFC device, which is in its passive communication mode within the NFC communication range 5. The ISO 14.443-4 standard defines in Part 6.2.3. READY State Description that immediately after a WUPA/WUPB command to wake up the active/passive NFC device 6 in its passive communication mode, a proprietary anti-collision process can be executed. FIG. 3 shows this general NFC communication setup up to the data exchange. In the course of this proprietary anti-collision process, a certain code can be sent as an application deactivation command from the transaction terminal 1 to the active/passive NFC device 6, which prevents the forced and automatic start of the Apple Pay application if the active/passive NFC device 6 recognizes the application deactivation command and processes it accordingly. As a result, the advantage is obtained that the automatic start of the Apple Pay application, which is undesirable for some application scenarios, is prevented also for the two above-described special cases.

What is claimed is:

1. A method for establishing communication between a transaction terminal and a mobile device located within communication range, wherein the transaction terminal is able to communicate in an active and in a passive communication mode and wherein the following process steps are performed:
   activating the passive communication mode in the transaction terminal for a first time range in order to establish a passive communication of the transaction terminal with a mobile active device possibly located within communication range;
   activating the active communication mode in the transaction terminal for a second time range in order to establish an active communication of the transaction terminal with a passive mobile device possibly located within communication range, if communication with a mobile active device was not established in the first time range;
   characterized by the following further process steps:
   detecting a carrier signal of a mobile active device possibly located outside the communication range during the first time range as well as during a third time range;
   remaining in the passive communication mode of the transaction terminal for the third time range, if the carrier signal of the mobile active device has been detected in order to establish a passive communication of the transaction terminal with the mobile active device, if the mobile active device gets within communication range during the third time range.

2. A method according to claim 1, characterized in that the following further process steps are performed:
   activating the active communication mode in the transaction terminal for the second time range in order to establish an active communication of the transaction terminal with a mobile passive device possibly located within communication range, if communication with the mobile active device was not established in the third time range.

3. A method according to claim 1, characterized in that the following further process steps are performed:
   emitting an application deactivation command by the transaction terminal directly during the setup of the active communication between the transaction terminal and a mobile passive device, which is within communication range.

4. A method according to claim 3, characterized in that the application deactivation command is sent to the mobile passive device in the course of a proprietary anti-collision procedure in order to avoid the automatic start of an application in the mobile passive device.

5. A method according to claim 1, characterized in that the communication setup is performed depending on the time range according to the ISO 14.443 and ISO 18.092 standards.

\* \* \* \* \*